United States Patent [19]

Lischin

[11] 4,199,659
[45] Apr. 22, 1980

[54] ELECTRONIC PREPAY ADAPTER CIRCUIT FOR CENTRAL OFFICE TELEPHONE EQUIPMENT

[75] Inventor: Alan J. Lischin, Lauderdale Lakes, Fla.

[73] Assignee: Ceeco, Melrose Park, Ill.

[21] Appl. No.: 934,479

[22] Filed: Aug. 17, 1978

[51] Int. Cl.² ........................................ H04M 17/02
[52] U.S. Cl. .............................................. 179/6.3 R
[58] Field of Search .................. 179/6.3 R, 6.5, 6.31; 194/44

[56] References Cited

U.S. PATENT DOCUMENTS

| | | | |
|---|---|---|---|
| 2,955,161 | 10/1960 | Faulkner | 179/6.3 R |
| 2,958,732 | 11/1960 | Maguire | 179/6.3 R |
| 3,003,034 | 10/1961 | Faulkner | 179/6.3 R |
| 3,020,347 | 2/1962 | Gatzert | 179/6.3 R |
| 3,448,218 | 6/1969 | Long | 179/6.3 R |
| 3,737,576 | 6/1973 | Spencer | 179/6.3 R |

*Primary Examiner*—Gerald Brigance
*Attorney, Agent, or Firm*—Mason, Kolehmainen, Rathburn & Wyss

[57] ABSTRACT

An electronic prepay adapter circuit is provided for use in converting semi-postpay central office telephone equipment to operation in a full prepay mode. In one arrangement, a prepay adapter circuit is connected on a line by line basis between each pay station and the associated line relay of the central office telephone equipment. In another arrangement, the prepay adapter circuit is connected between the linefinder and the first selector of the central office telephone equipment and utilized on a common or shared basis for a plurality of pay station telephone lines. The prepay adapter circuit is easily connected as a self-contained unit or module into the central office telephone equipment by the connection of the central office battery supply, ringing generator, collect and return voltage supplies, sleeve control lead, and the tip and ring line connections.

8 Claims, 6 Drawing Figures

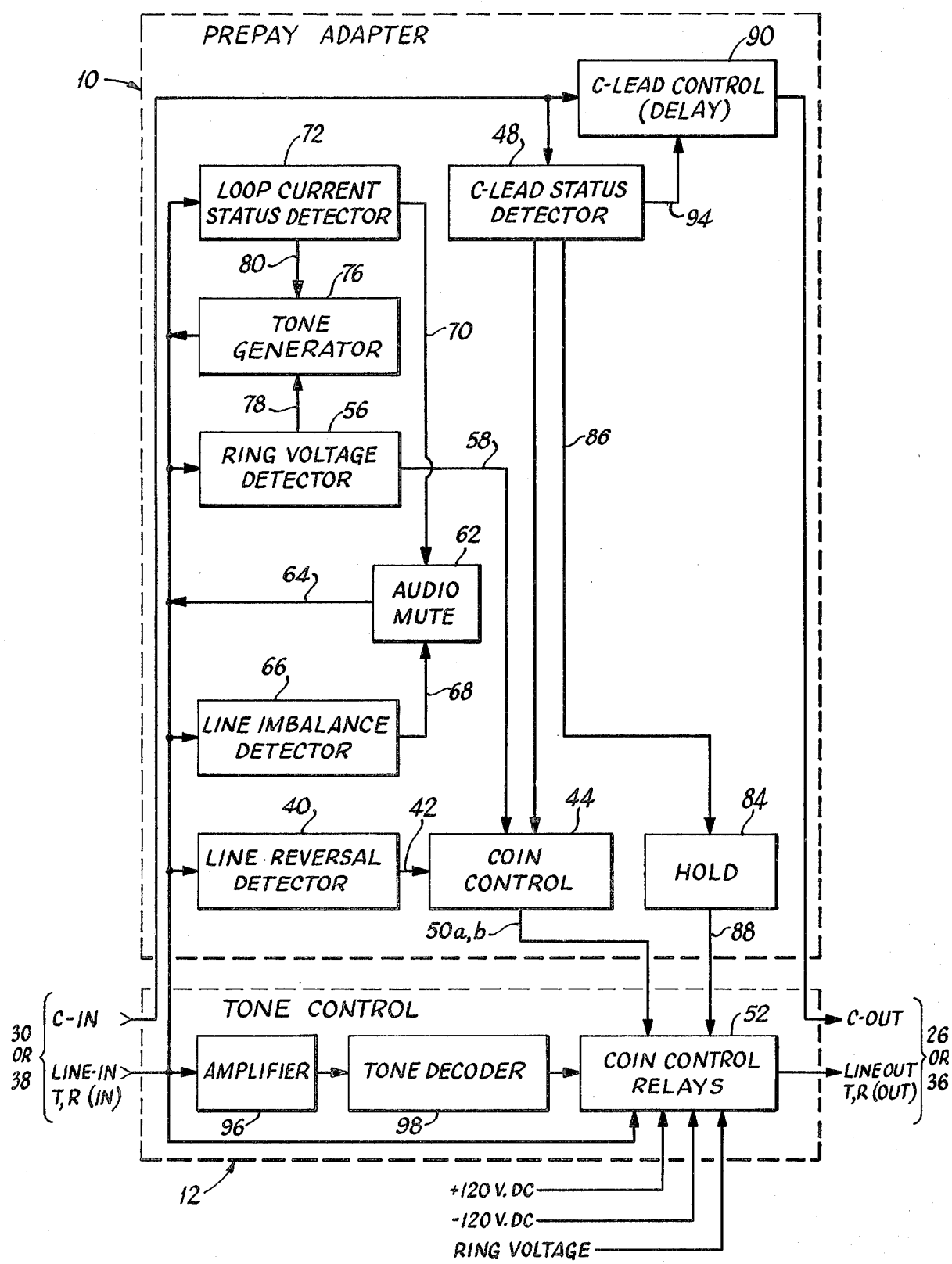

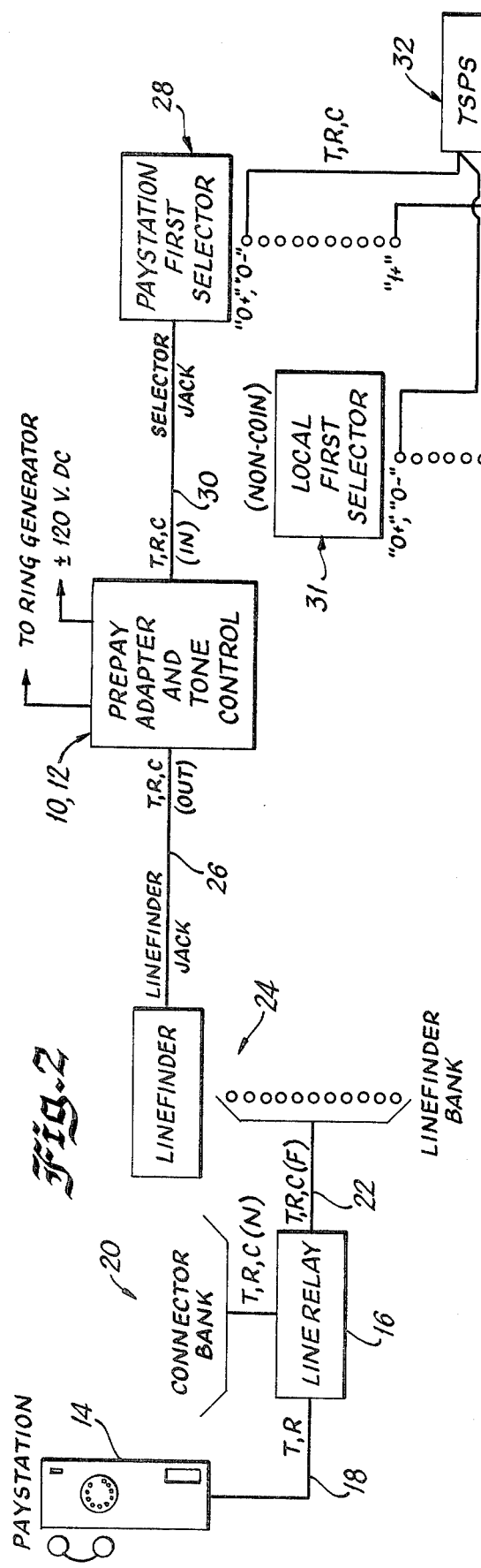
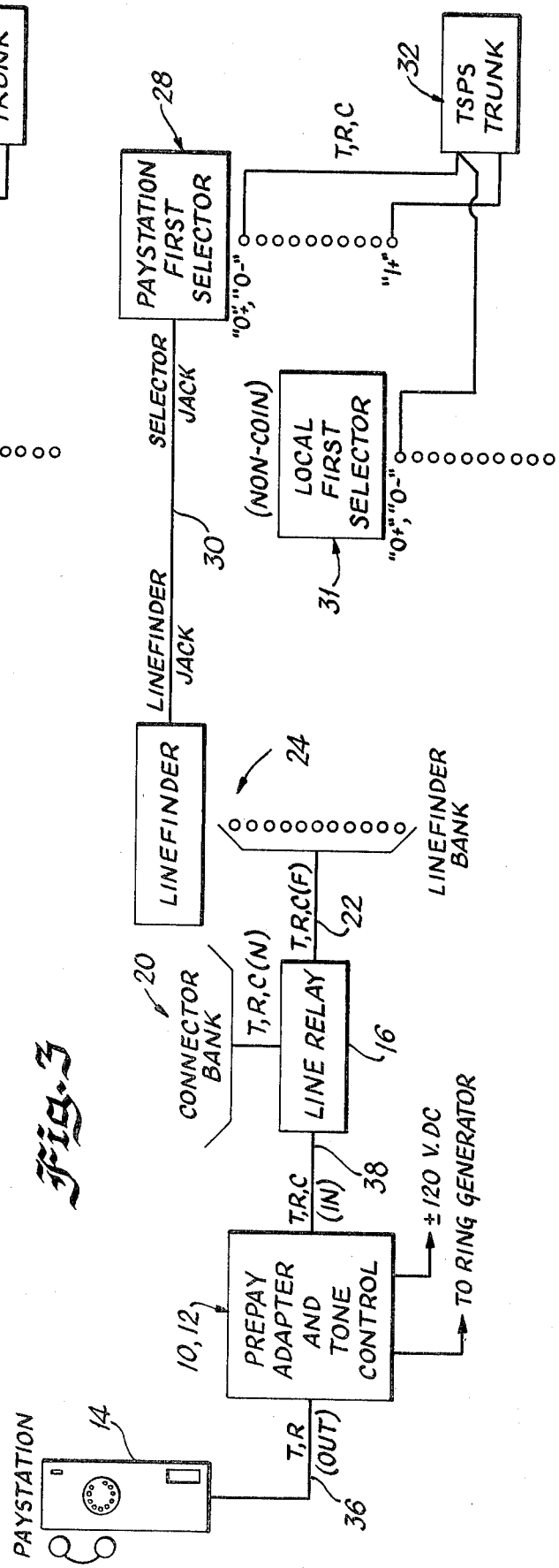

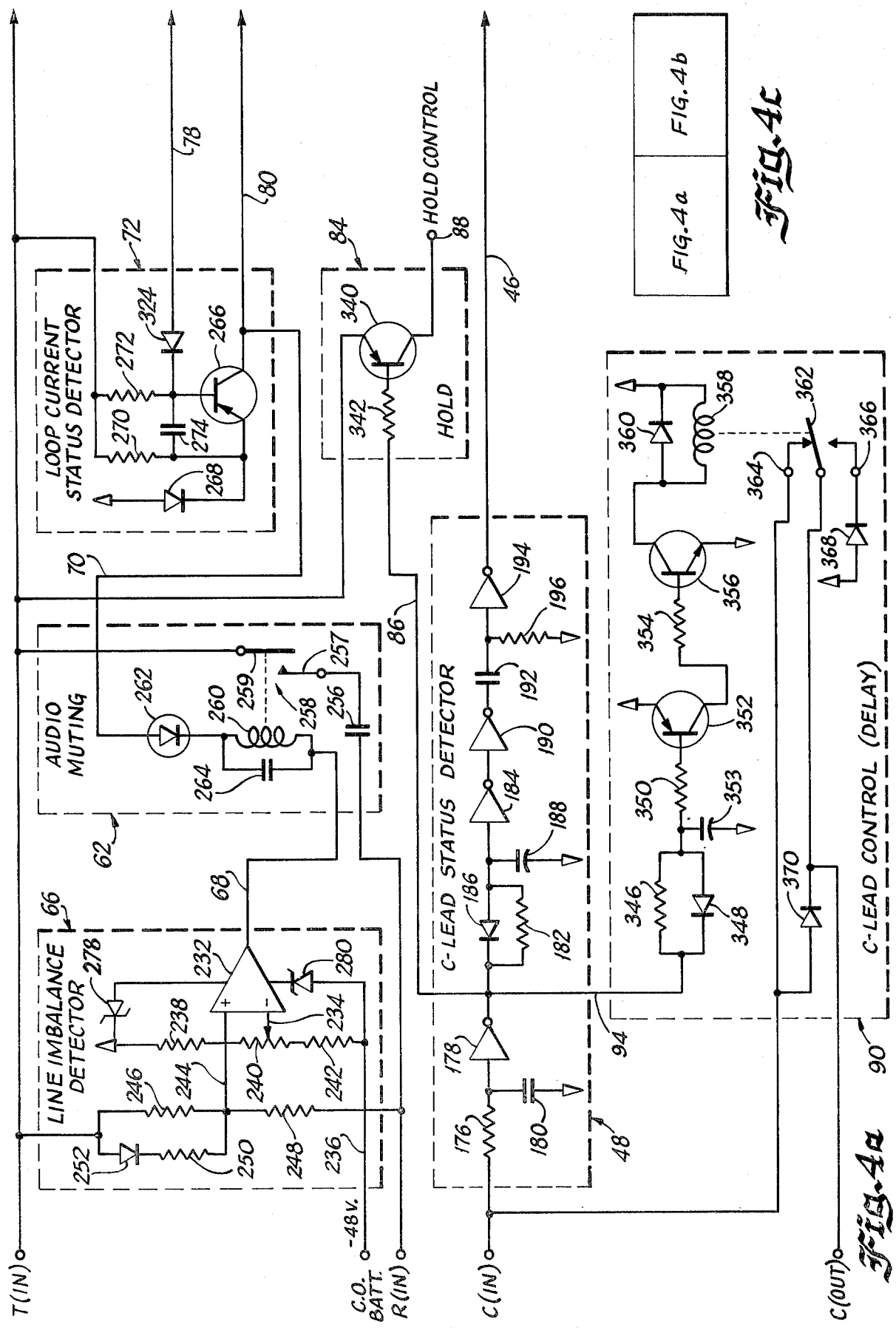

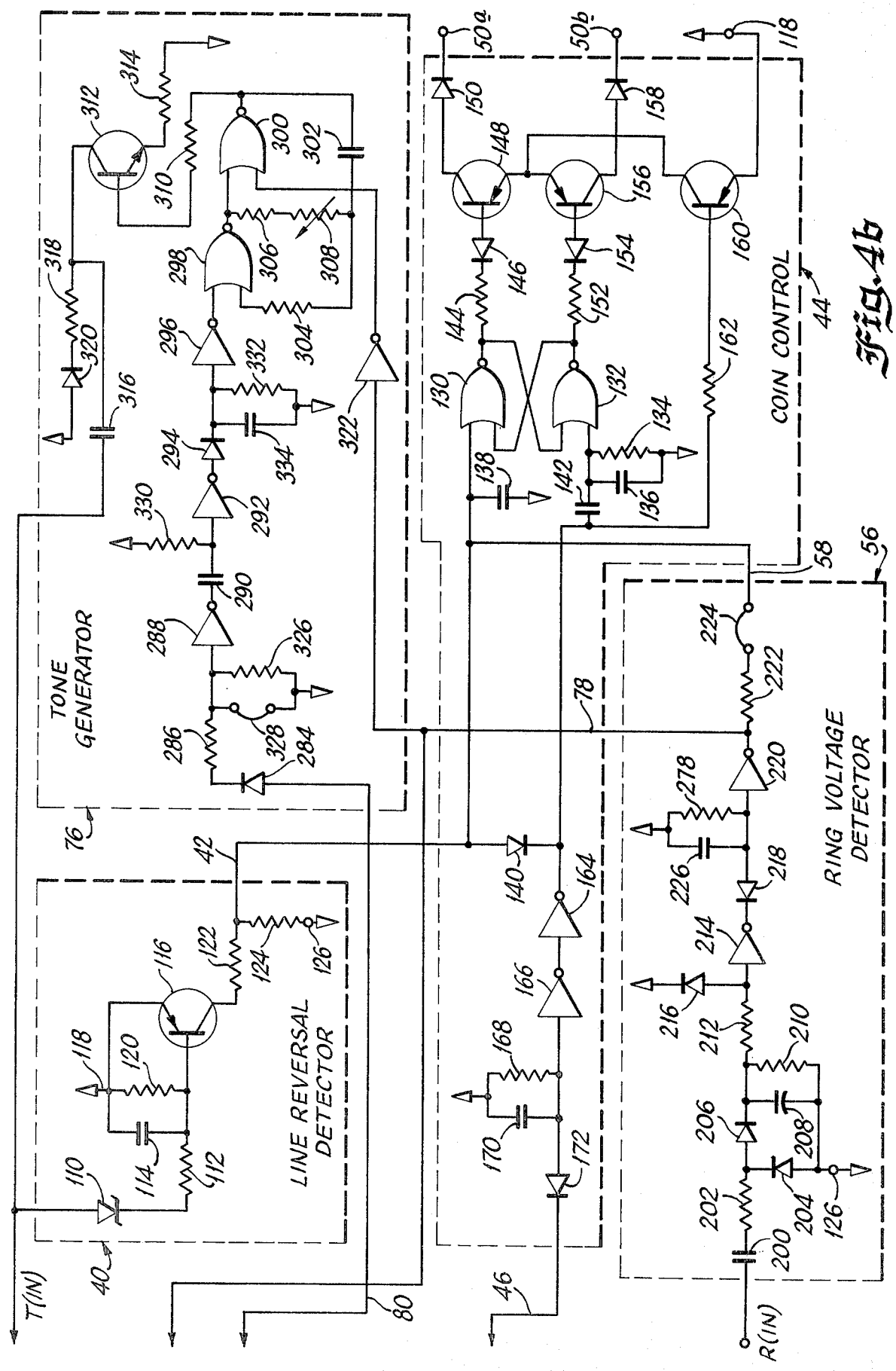

ELECTRONIC PREPAY ADAPTER CIRCUIT FOR CENTRAL OFFICE TELEPHONE EQUIPMENT

BACKGROUND OF THE INVENTION

A. Field of the Invention

The present invention relates generally to the field of telephone apparatus and more particularly to a prepay adapter circuit for converting central office telephone equipment from semi-postpay operation to full prepay operation.

B. Description of the Prior Art

Pay stations are generally available for full prepay operation with central office telephone equipment that includes control circuitry for operation of the pay station in a full prepay mode. One pay station of this general type is the Model 201 pay station manufactured by the Communication Equipment & Engineering Company of Melrose Park, Ill. 60160.

In many locations existing central office telephone equipment provides semi-postpay operation and is not compatible or capable of operation with full prepay, pay stations.

Thus, the need arises for circuitry to adapt or convert existing semi-postpay central offices for operation as full prepay central offices without extensive modifications of the existing central office telephone equipment and without the entire replacement of the central office equipment.

SUMMARY OF THE INVENTION

It is a principal object of the present invention to provide an electronic prepay adapter circuit for converting semi-postpay central office telephone equipment to operation in a full prepay mode operation in an efficient, economical manner and without extensive modification of the existing central office telephone equipment.

It is a further object of the present invention to provide an electronic prepay adapter circuit for converting existing semi-postpay central office telephone equipment to full prepay operation with a minimum of interconnections and changes to the existing central office telephone equipment.

Briefly, in accordance with one important aspect of the present invention there is provided an electronic prepay adapter circuit for converting existing semi-postpay central office telephone equipment to full prepay operation. In one arrangement, a prepay adapter circuit is connected on a line by line basis between each pay station and the associated line relay of the central office telephone equipment. In another arrangement the prepay adapter circuit is connected between the linefinder and first selector of the central office telephone equipment and utilized on a common or shared basis for a plurality of pay station telephone lines. The prepay adapter circuit is easily connected as a self-contained unit or module into the central office telephone equipment by the connection of the standard central office battery supply, ringing generator, collect and return voltage supplies, sleeve control lead, and the tip and ring telephone line connections.

The invention both as to its organization and method of operation together with further objects and advantages thereof will best be understood by reference to the following specification taken in connection with the accompanying drawings.

BRIEF DESCRIPTION OF THE DRAWINGS

FIG. 1 is a block diagram representation of the prepay adapter circuit of the present invention;

FIG. 2 is a block diagram representation of the prepay adapter circuit of the present invention of FIG. 1 as connected to central office telephone equipment on a multi-line or line shared basis;

FIG. 3 is a block diagram representation similar to FIG. 2 but illustrating the connection and use of the prepay adapter circuit of the present invention of FIG. 1 on a dedicated line basis for each pay station; and FIGS. 4a and 4b when combined as shown in FIG. 4c are a detailed electrical schematic diagram of a specific embodiment of the prepay adapter circuit of the present invention of FIG. 1.

DESCRIPTION OF THE PREFERRED EMBODIMENT

Referring now to FIGS. 1, 2 and 3, the prepay adapter circuit of the present invention referred to generally at 10 and a tone control circuit referred to generally at 12 are shown in connection with central office telephone equipment in FIGS. 2 and 3. The tone control circuit 12 is of the general type that receives tone signalling from a toll center, decodes the received tone signalling, and controls the collect and return functions of a pay station. In a specific embodiment of the tone control circuit 12 is a Model TD-4 tone control system manufactured by Communication Equipment & Engineering Company. However, it should also be understood that the prepay adapter circuit 10 of the present invention in other embodiments is connected to control various other coin control arrangements and devices.

The prepay adapter circuit 10 in the arrangement illustrated in FIG. 2 is connected along with the tone control circuit 12 to central office telephone equipment on a shared or multi-line basis to service a plurality of telephone pay stations 14. Each of the pay stations 14 associated with the central office equipment of FIG. 2 is connected to a respective line relay 16 over a telephone line pair 18 commonly referred to as tip and ring. A predetermined number of the line relays 16 are associated with a particular connector bank referred to generally at 20. The tip and ring leads along with the control lead or sleeve from the connector bank 20 are connected from the line relay 16 to a respective point on a linefinder bank referred to generally at 24. Thus, the linefinder 24 controls a plurality of pay stations 14 through respective line relays 16. The tip, ring and control leads connecting the line relay 16 to the linefinder bank are referred to at 22 and identified as T, R, C, (F).

In accordance with important aspects of the present invention, the prepay adapter circuit 10 and the tone control circuit 12 are connected between the linefinder equipment 24 and the pay station first selector equipment 28 of the existing semi-postpay central office equipment thus converting the existing semi-postpay central office equipment to a full prepay central office. The prepay adapter 10 and the tone control circuit 12 are connected to the linefinder equipment 24 by the tip, ring and control lines referred to generally at 26 and identified as T,R, C, (OUT).

The prepay adapter circuit 10 and the tone control circuit 12 are connected to the pay station first selector 28 of the central office equipment over the lines 30 identified as T, R, C, (IN) and corresponding to the tip, ring and control lead inputs from the first selector. The pay station first selector 28 and the local first selector 31 of non-coin operated equipment are connected to the trunk circuitry of the central office equipment referred to generally at 32. For example, the trunk may be a TSPS trunk connected to a toll center and thus the central office equipment illustrated in FIG. 2 is of the remote type.

Referring now to FIG. 3, and in accordance with other important aspects of the present invention, each of the prepay adapter circuits 10 and the tone control circuits 12 are connected to the existing semi-postpay central office equipment on a line by line or dedicated pay station basis to convert the existing central office equipment to full prepay operation. Eacy pay station 14 is connected to a respective prepay adapter circuit 10 and a tone control circuit 12 over a telephone line pair 36 corresponding to the tip and ring leads and identified as T, R, (OUT) in FIG. 3. Each of the prepay adapter circuits 10 and the tone control circuits 12 associated with each respective pay station 14 are connected to a line relay 16 over the lines 38 corresponding to the tip, ring and control input lines referred to at 38 and identified as T, R, C (IN). Each of the line relays 16 associated with a particular connector bank 20 is connected over the lines 22 identified as T, R, C (F) to a linefinder bank of the linefinder equipment 24. The linefinder 24 is connected to the pay station first selector 28 over the lines 30. The pay station first selector 28 and the local first selector 31 of non-coin operated equipment are connected to the trunk arrangement 32.

Thus, the converted, full prepay central office equipment arrangements of FIGS. 2 and 3 with the interconnected prepay adapter circuits 10 and the tone control circuits 12 differ only in the manner in which the prepay adapter circuits 10 and the tone control circuits 12 are interconnected in the central office equipment; i.e. on a dedicated or per line basis in the arrangement of FIG. 3 and on a shared line basis in the arrangement of FIG. 2.

In the arrangement of FIG. 2, a prepay adapter circuit 10 and a tone control circuit 12 is provided for each linefinder bank that services a predetermined plurality of pay stations 14. In the arrangement of FIG. 3, a prepay adapter circuit 10 and a tone control circuit 12 is provided for each line pair to a pay station 14.

In accordance with important aspects of the present invention and referring now again to FIG. 1, the prepay adapter circuit 10 includes a line reversal detector 40 for the answer supervision detection of the reversal of the polarity of the tip and ring leads when the called party answers on a pay station originated call. Upon the detection of a line reversal condition, the line reversal detector 40 generates an output at 42 that is connected as an input to the coil control stage 44. The coin control stage 44 upon the line reversal at 42 is conditioned to a "set to collect" state or mode. The coin control stage 44 includes a second input 46 generated by a C-lead status detector stage 48. The C-lead status detector stage 48 is connected to the control lead identified as C-IN of the lines 38 of FIG. 3 or the lines 30 of FIG. 2 to detect the condition of the pay station 14 going on-hook at the end of a call. When the hang-up condition is detected, the C-lead status detector stage 48 generates an output at 46 to the coin control stage 44. After these conditions, the coin control stage 48 generates an output at 50 to control the coin control relays referred to generally at 52 of the coin control circuit 12 to produce a collect condition on the tip and ring lines, T, R, (OUT), corresponding to either the lines 26 of FIG. 2 or the lines 36 of FIG. 3. The coin control stage 44 generates a collect control signal 50 to the coin control relay arrangement 52 a predetermined time interval, one second in a specific embodiment, after the C(IN) status changes, denoting an on-hook condition. The collect control signal 50 remains active for a second predetermined time interval, one second in a specific embodiment.

The coin control stage 44 is then reset to a "set to return" condition until again actuated by the above or other conditions. If a free or incomplete call is made, the coin control stage 44 remains in the "set to return" state and a return control signal is generated at 50 conditioning the coin control relays at 52 to generate a return signal to the pay station on the tip and ring lines, T, R (OUT).

The prepay adapter circuit 10 also includes a ring voltage detector stage 56 that is connected to the ring lead to generate an output at 58 upon the detection of ringing voltage to the pay station 14. The output 58 is connected to the coin control stage 44 to set the coin control stage 44 to the "set to collect" condition on the detection of ringing voltage. When the hang-up signal is detected from the pay station 14 by the C-lead status detector stage 48, the coin control stage 44 will generate the collect control signal at 50 to the coin control relays 52. In accordance with an important aspects of the present invention this sequence is effective during an incoming call to the pay station 14 to provide automatic collection of coins during an incoming collect call. On non-collect incoming calls, no coins will be deposited and thus the collect signal will not collect any coins. However on incoming collect calls, the collect signal insures that all deposited coins will be automatically collected after termination of the call in the event that the operator forgets to manually actuate the collect control signals or if the telephone equipment fails to perform the collection. If an incoming call is not answered at the pay station, the coin control stage 44 will be automatically reset one second after the C-lead status detector stage 48 detects a change in condition of the C-lead from ground potential to the level of the central office battery, normally −48 VDC.

In accordance with other important aspects of the present invention, the prepay adapter circuit 10 includes an audio muting stage 62 to selectively place a capacitive shunt across the tip and ring lines to the pay station 14 at output 64 upon the occurrence of predetermined conditions. These predetermined conditions are the detection of a line reversal, the detection of loop current, and no deposit acknowledgement signal from the pay station 14. The capacitive shunt across the tip and ring conductors at 64 by the audio muting stage 62 drastically attenuates and essentially mutes the transmit and receive audio signals without effecting the DC loop current to the pay station 14.

The pay station 14 acknowledges receipt of an appropriate deposit by the placing of an inductive ground on the telephone line pair. This causes an imbalance between the current flowing within tip and ring lines and thus a change in the voltage drops across the tip and ring lines as measured across the respective relay winding impedances in the central office equipment. This change or differential voltage condition is utilized by a line imbalance detector stage 66 to detect the presence of the inductive ground and thus the acknowledgement of a deposit. The line imbalance detector stage 66 generates an output at 68 to the audio muting stage 62 to indicate the deposit acknowledgement condition.

The audio muting stage 62 also includes an input at 70 from a loop current status detector stage 72 connected to detect the loop current over the telephone line pair to the pay station 14. The audio muting stage 62 is operative to mute the audio path to the pay station when the line reversal condition is detected by stage 66, loop current is detected by stage 72 and no line imbalance condition is detected by the stage 66 indicating no deposit acknowledgement. When a proper deposit is acknowledged and the line imbalance detector 66 detects this condition, the audio muting condition is removed by the audio muting stage 62. When the normal polarity condition is present on the tip and ring lines, the line imbalance detector 66 inhibits generation of any audio muting function by the audio muting stage 62. Thus, audio muting is inhibited for free calls to the operator, a 911 emergency number of other calls that do not result in reverse line polarity (answer supervision). The audio muting stage 62 is enabled by the input 70 only during the detection of loop current to prevent false operation due to ringing voltages for example. This reduces the possibility of damage to the components in the audio muting stage 62.

In accordance with yet other important aspects of the present invention, the prepay adapter circuit 10 includes a tone generator stage 76 to generate an audible identification tone on the telephone line pair in situations where it is desirable to alert the operator that a public phone or pay station is being called. The tone generator stage 76 is selectively operable as an optional feature by means of a selection arrangement. The tone generator 76 is operative to generate a preselected audible tone to alert the operator when ringing voltage has been detected by the stage 66 at output 78 connected as an input to the tone generator stage 76 and after a loop current has been detected by the stage 72. Thus, the tone generator 76 generates the audible tone for a predetermined interval of time after a pay station has been answered. The loop current detector stage 72 generates an output 80 indicating that the pay station 14 has been answered or placed off-hook. The output 78 of the ring voltage detector stage 56 indicates that the pay station 14 has been rung.

In accordance with other important aspects of the present invention, the prepay adapter circuit 10 includes a hold stage 84 to present an appropriate termination impedance to the central office equipment during coin control operations to prevent release of the line relay 16 of the central office equipment. Further, during coin control operations for local calls when the pay station 14 is in an on-hook condition, the termination must not appear on the telephone line to the central office. The hold stage 84 is effective to satisfy the above conditions and present an appropriate termination of the central office equipment during toll calls and while coin control operations are operative. The hold stage is controlled by an output 86 of the C-lead status detector stage 48. Thus, if the pay station 14 is in an off-hook condition when coin control signalling occurs, the hold stage 84 at an output 88 through the coin control relay arrangement 52 connects the fixed termination to the tip line T (IN) of the central office equipment. If the pay station 14 is on-hook when the coin control functions occur, the C-lead status detector 48 will inhibit operation of the hold stage 84.

When the prepay adapter circuit 10 is connected on a shared line basis to service a plurality of pay stations 14 as illustrated in FIG. 2, a C-lead control stage 90 is utilized by the prepay adapter circuit 10 to appropriately condition the state of the C-OUT lead, the control lead to the linefinder equipment 24. This conditioning of the C-OUT lead is required to prevent premature release by the linefinder 24 of a particular line to a pay station 14 that is placed in an on-hook condition. The premature release could occur before the appropriate collect or return control functions are performed. With the pay station 14 off hook, the C-lead from the linefinder 24 identified as C-OUT will switch to a ground potential. In this state, the C-OUT condition is passed to the C-IN line to the first selector 28. The C-lead status detector stage 48 generates a signal at an output 94 to the lead C-lead control stage 90 to condition the C-lead control stage 90 to output a ground potential on the C-OUT line to the linefinder equipment 24 for a predetermined interval of time after the pay station 14 has been placed in an on-hook condition and independent of the condition of the C-IN line returning to the central office battery voltage of approximately −48 volts. Thus, a predetermined time interval after hand-up of the pay station 14 is provided during which the coin control functions are performed before the linefinder equipment 24 releases the line to the pay station 14.

The tone control circuit 12 in a specific embodiment includes an amplifier stage 96 connected to the T, R (IN) lines of the lines 30 of FIG. 2 or the lines 38 of FIG. 3 to amplify the tone signalling. The output of the amplifier stage 96 is connected to a tone decoder stage 98 that generates decoded signals to control the coin control relay arrangement 52. The T, R (IN) lines are also connected to the coin control relay arrangement 52. The coin control relay arrangement 52 also includes an uninterrupted ringing voltages input and two coin control input voltages. The coin control input voltages conventionally are +120 VDC for the collect function and a −120 VDC line for the return function. The coin control relay arrangement 52 is operative to output +120 VDC on the T, R (OUT) lines for a collect function and the −120 VDC on the T, R (OUT) lines for a return function. During the coin control periods, the coin control relay arrangement 52 isolates the tip and ring input lines T, R (IN) at 30 or 38 from the T, R (OUT) lines at 26 or 36 and places the collect voltage (+120 VDC) or return voltage (−120 VDC) on the output tip and ring lines T, R (OUT) at 26 or 36. When no coin control function or ring function is being performed, the coin control relay arrangement 52 connects the T (IN) line to the T (OUT) line and the R (IN) line to the R (OUT) line. For the details of the interconnections of the collect, return and ring relays, reference may be made to the Model TD-4 tone control circuit discussed hereinbefore.

Referring now to FIG. 4 and considering a specific embodiment of the prepay adapter circuit 10 of FIG. 1, the line reversal detector stage 40 is connected to the tip side T (IN) of the telephone line connections at 30 or 38. The anode of a zener diode 110 is connected to the T (IN) line and the cathode of the zener diode 110 is connected through a resistor 112 to one side of a capacitor 114 and also to the base lead of a PNP transistor 116. The other end of the capacitor 114 is connected to the ground reference potential 118. A resistor 120 is connected across the capacitor 114. The emitter lead of the transistor 116 is also connected to the ground references 118. The collector lead of the transistor 116 is connected through a resistor 122 to the output 42 of the line reversal detector stage 40 that is connected to the coin control stage 44. A resistor 124 is connected between the output 42 and the negative supply reference potential 126. In a specific embodiment where a −48VDC central office battery is utilized, the zener diode 110 is a 24 volt diode and the negative supply reference potential is −12 VDC.

When answer supervision occurs with a reversal of the normal polarity of the tip and ring lines, the voltage on the T (IN) line will change from a range of approximately −4 to −18 volts to a range of approximately −30 to −44 volts. This reverse polarity level on the T (IN) line will render the transistor 116 conductive and produce a change in the output state at the output line 42. Upon reverse polarity detection, the output at 42 changes to a high level defined as a logicl level near the ground reference potential 118. A low level is defined as a reference level near the minus supply reference potential 126, i.e. near −120 VDC.

The coin control stage 44 is responsive to the input at 42 to be conditioned to a "set to collect" state as discussed hereinbefore. The coin control stage 44 includes a latch arrangement provided by two, two-input NOR gates 130 and 132. One input of the NOR gate 130 is connected to the input 42 from the line reversal detector stage 40. The second input of the NOR gate 130 is connected to the output of the NOR gate 132. The output of the NOR gate 130 is connected to one input of the NOR gate 132. The second input of the NOR gate 132 is connected to the negative supply reference 126 through a resistor 134. A capacitor 136 is connected across the resistor 134. A capacitor 138 is connected between the output 42 and the negative supply 126. A diode 140 is connected anode to cathode between the output 42 and one end of a capacitor 142. The other end of the capacitor 142 is connected to the input of the NOR gate 132 that is connected to the resistor 134. The output of the NOR gate 130 is connected through the series combination of a resistor 144 and a diode 146 arranged cathode to anode to the base of a PNP transistor 148.

The collector of the transistor 148 is connected through a diode 150, anode to cathode, to the collect control line output 50a that is connected to the coin control relay arrangement 52. The output of the NOR gate 132 is connected through the series combination of a resistor 152 and a diode 154, arranged cathode to anode, to the base lead of a PNP transistor 165. The collector lead of the transistor 156 is connected anode to cathode through a diode 158 to the return control line 50b that is connected to the coin control relay arrangement 52. The emitter leads of the two transistors 148 and 156 are connected to each other and to the collector of a PNP transistor 160.

The emitter lead of the transistor 160 is connected to the ground reference 118 and the base lead of the transistor 160 is connected through a resistor 162 to the cathode of the diode 140. The cathode of the diode 140 is also connected to the output of a first inverter gate 164. The input of the inverter gate 164 is connected to the output of another inverter gate 166. The input of the inverter gate 166 is connected through the parallel combination of a resistor 168 and a capacitor 170 to the ground reference 118. The input of the inverter gate 166 is also connected through a diode 172 arranged anode to cathode to the output 46 of the C-lead status detector stage 48.

The latch of the coin control stage 44 formed by the gates 130 and 132 is set to the "set to collect" condition by the high logic level at output 42 of the line reversal detector stage 40 upon detection of the reverse polarity answer supervision. The latch forward biases the base-emitter junction of the transistor 148. However, transistor 148 does not conduct and generate the collect control signal at 50a until the transistor 160 is activated through the output 46 by the C-lead status detector stage 48. The output 46 of the C-lead status detector stage 48 activates transistor 160 when the pay station 14 is placed in an on-hook condition with the C-IN lead to stage 48 switching to a battery voltage of approximately −48 VDC.

The C-lead status detector stage 48 utilizes the C (IN) control lead as an input connected through a resistor 176 to the input of an inverter gate 178. A capacitor 180 is connected between the input of the inverter gate 178 and the negative supply 126. The output of the inverter gate 178 is connected to the output 94 of the C-lead status detector stage 48 that is connected as an input to the C-lead control stage 90. The output of the inverter gate 178 is also connected through a resistor 182 to the input of an inverter gate 184. A diode 186 is connected cathode to anode between the output of the inverter gate 178 and the input of the inverter gate 184. A capacitor 188 is connected between the input of the inverter gate 184 and the negative supply 126. The output of the inverter gate 184 is connected through an inverter gate 190 to one end of a capacitor 192. The other end of the capacitor 192 is connected to the input of an inverter gate 194. The output of the inverter gate 194 is connected to the output 46 of the C-lead status detector stage 48. A resistor 196 is connected between the inverter gate 194 and the negative supply 126.

When the pay station 14 is placed in an on-hook condition at the termination of a conversation, the C (IN) lead switches to a voltage of −48 volts. This generates a negative going pulse at the output of inverter gate 194; the output 46 to the coin control stage 44. The negative pulse at output 46 charges the capacitor 170 of the coin control stage 44. Once charged, the capacitor 170 discharges through the resistor 168.

When the C (IN) lead switches to a −48 VDC level, the generation of the negative pulse at 46 is delayed by the RC time constant determined by the resistor 182 and the capacitor 188 for a first predetermined time interval, approximately one second in a specific embodiment. Thus, the transistor 160 is rendered conductive after the first predetermined time interval and remains conductive for a second predetermined time interval, approximately one second in a specific embodiment, as determined by the time constant of the resistor 168 and the capacitor 170.

If the coin control stage 44 has been previously placed in a "set to collect" condition and with transistor 160 rendered conductive, a current path will be established from ground reference 118 through the emitter-collector junction of the transistor 160, the emitter-collector junction of the transistor 148, diode 150 and via the collect control line 50a through the collect relay of the coin control relay arrangement 52. The coin control relay arrangement 52 then outputs the +120 VDC collect signal to the pay station 14. After the discharge of the capacitor 170, a high logic level is generated at the output of the inverter gate 164 denoting the end of the second predetermined time interval. The latch formed by gates 130 and 132 is then conditioned or reset to a "set to return" condition through the capacitor 142, and transistor 160 is rendered non-conductive.

If a free or incomplete call is made, line reversal does not take place and the reversal detector stage 40 does not generate an output at 42 and the coin control stage 44 is in a "set to return" state. When the pay station 14 goes on hook, the C (IN) lead switches to a −48 VDC level and the transistor 160 is activated after the first predetermined time interval for the second predetermined time interval and transistor 156 is rendered conductive as the coin control stage 44 is in a "set to return" state. Thus, a current path is established via the return line control line 50b to activate the return relay in the coin control relay arrangement 52. The coin control relay arrangement 52 generates a −120 VDC return signal to the pay station 14.

The ring voltage detector stage 56 of the prepay adapter circuit 10 utilizes the R (IN) line as an input. The R (IN) line is connected through the series combination of a capacitor 200 and a resistor 202 to a diode rectifying arrangement including two diodes 204 and 206 arranged to rectify the ringing voltage. One diode 204 is connected cathode to anode between the resistor 202 and the negative supply 126. The second diode 206 is connected anode to cathode between the cathode of the diode 204 and one end of a capacitor 208. The other end of capacitor 208 is connected to the negative supply 126. A resistor 210 is connected across the capacitor 108. The cathode of the diode 206 is connected through a resistor 212 to an input of an inverter gate 214. A diode 216 is connected anode to cathode between the input of the inverter gate 214 and the ground reference 118.

Thus, the ringing voltage is rectified by the diodes 204 and 206 and filtered by the capacitor 208. The output of the inverter gate 214 is connected through a diode 218 arranged cathode to anode to the input of an inverter gate 220. The output of the inverter gate 220 is connected to the output 78 of the ring voltage detector stage 56 that is connected as an input to the tone generator stage 76. The output of the inverter gate 220 is also connected through a resistor 222 and a selective connection arrangement 224 to the output 58 of the ring voltage detector stage 56.

The selective connection arrangement 224 in a specific embodiment is a jumper wire which is connected to render the ring voltage detector stage operable to output a signal at the output 58. The jumper wire 224 is omitted or disconnected if the feature to output a signal at 58 is not required. The parallel combination of a capacitor 226 and a resistor 228 are connected between the input of the inverter gate 220 and the ground reference 118.

Upon the detection of ringing voltage, the output 58 is effective to set the latch formed by gates 130 and 132 of the coin control stage 44 to the "set to collect" condition. As explained hereinabove, this sequence is effective to provide an automatic collection feature for incoming collect calls to the pay station to thereby assist the operator.

The line imbalance detector stage 66 of the prepay adapter circuit 10 includes a comparator stage 232. The output of the comparator stage 232 is connected to the output 68 of the line imbalance detector stage 66. One input 234 of the comparator stage 232 is connected to a voltage divider arrangement connected between the ground reference 118 and the −48 volt central office battery connection 236. The voltage divider arrangement is provided by the series combination of a resistor 238, a potentiometer 240 and a resistor 242 connected between the ground reference 118 and the −48 volt central office battery supply line 236.

A second input 244 to the comparator 232 is connected to the junction of two resistors 246 and 248. The series combination of resistors 246 and 248 is connected between the T (IN) line and the R (IN) line. The resistors 246 and 248 are equal resistances and thus the voltage supplied to the input 244 is the midpoint between the T (IN) and R (IN) potentials when the line polarity is in a reverse condition. The input 244 of the comparator 232 is also connected through the series connection of a resistor 250 and a diode 252 arranged cathode to anode to the T (IN) lead.

The voltage divider provided by resistor 238, resistor 242 and potentiometer 240 is selected and adjusted to provide a voltage at the input 234 that is approximately 48% of the full central office battery voltage at 236 with respect to the ground reference 118. With the line polarity reversed and balanced, the input 244 is exactly 50% of the battery voltage. In this condition the input 244 is lower or more negative than the input at 234 and thus the output at 68 is a low state.

This is the condition for a pay station originated call, low output state at 68, when the called party has answered and the proper coin deposit acknowledgement has not yet occurred. In this state the muting stage 62 in response to the output at 68 provides an audio mute condition between the T (IN) and R (IN) lines to the pay station 14.

The audio mute stage 62 includes a capacitor 256 connected between the R (IN) line and one contact 257 of a pair of normally open relay contacts 258. The other contact 259 of the relay contacts 258 is connected to the T (IN) line. The relay contacts 258 are controlled by an associated relay coil 260. The relay coil 260 is connected between the output 68 of the line imbalance detector stage 66 and the cathode of an LED indicator 262. The anode of the LED indicator 262 is connected to the output 70 of the loop current status detector stage 72. A capacitor 264 is connected across the relay coil 260.

The loop current status detector stage 72 includes a PNP transistor 266. The collector lead of the transistor 266 is connected to the output 70. The emitter lead of the transistor 266 is connected through a diode 268 arranged cathode to anode to the ground reference 118. The emitter lead of the transistor 266 is also connected through a resistor 270 to the T (IN) line. The base lead of the transistor 266 is connected through a resistor 272 to the T (IN) line. A capacitor 274 is connected between the base and emitter leads of the transistor 266.

In a reverse polarity condition, the transistor 266 is rendered conductive by the negative level on the T (IN) line. Thus, the loop current status detector stage 72 provides a current path from the ground reference 118 through the diode 268, the emitter to collector junction of the transistor 266, the LED indicator 262, the relay coil 260, and via the low state at output 68 through the line imbalance comparator 232. Thus, with current through the relay coil 260, the normally open contacts 258 are closed to place the capacitor 256 across the ring and tip lines to the pay station 14 to mute the audio path.

Upon the proper deposit of coins into the pay station 14, the imbalanced line condition from the pay station 14 acknowledges the receipt of the proper deposit. This line imbalance condition is detected by the line imbalance detector stage 66. Specifically, the voltage present at the input 244 of the comparator 232, now changes to about 35 to 45% of the battery voltage dependent upon the pay station line loop length and the ground resistance conditions. In this condition, the input 244 is higher or less negative than the input at 234. Thus, the output 68 of the comparator stage 232 will switch to a high level state. This high output state will inhibit any current flow through the relay coil 260 and thus the relay contacts 258 will return to the normally open state. The audio mute condition to the pay station 14 is then removed and normal conversation and progress of the call ensues.

Under normal line polarity conditions, the diode 252 and the resistor 250 present a voltage level at the input 244 equal to approximately 25% of the central office battery voltage. This level is always higher or less negative then the input at 234 and the relay contacts 258 will remain in the open condition regardless of the presence or absence of the imbalance condition from the pay station 14. This prevents any audio muting during normal line polarity to allow free calls to the operator, 911 emergency calls or any other number designations which do not result in reverse answer supervision. It should be understood that all the voltage comparisons are determined as a percentage of the central office battery voltage and thus fluctuations in the battery voltage have no effect on the operation of the line imbalance detector stage 66. Indicator 262 serves to indicate the status of the comparator stage 232 during adjustments of the potentiometer 240. Transistor 266 further prevents the relay contacts 258 from operating during idle line conditions such as might be caused by voltage transients or ringing voltage on the line to prevent a false of the comparator 232 from operating the relay contacts 258 by supplying current to the relay coil 260. Zener diodes 278, 280 are connected to the supply inputs of the comparator 232 and to the ground reference 118 and to the −48 volt battery line 246 to provide a 12 volt supply to the comparator stage 242.

The tone generator stage 76 of the prepay adapter circuit 10 includes a diode 284 having an anode lead connected to the output 80 of the loop current status detector stage 72. The cathode of the diode 284 is connected through a resistor 286 to the input of an inverter gate 288. The output of the inverter gate 288 is connected through a capacitor 290 to the input of an inverter gate 292. The output of the inverter gate 292 is connected through a diode 294 arranged anode to cathode to the input of an inverter gate 296. The output of the inverter gate 296 is connected to one input of a two input NOR gate 298. The two input NOR gate 298 along with another two input NOR gate 300 provides an audio oscillator.

The output of the NOR gate 298 is connected to one input of the NOR gate 300. The output of the NOR gate 300 is connected through the series combination of a capacitor 302 and a resistor 304 to the second input of the NOR gate 298. The output of the NOR gate 298 is also connected through the series combination of a resistor 306 and a variable resistor 308 to the junction of the resistor 304 and the capacitor 302. The output of the NOR gate 300 is connected through a resistor 310 to the base lead of an NPN transistor 312. The emitter lead of the transistor 312 is connected to the negative supply 126 through a resistor 314. The collector lead of the transistor 312 is connected to the T (IN) line through a capacitor 316. The collector of the transistor 312 is also connected to the ground reference 118 through the series combination of a resistor 318 and a diode 320 arranged cathode to anode.

The second input of the NOR gate 300 is connected to the output of an inverter gate 322. The input of the inverter gate 322 is connected through a diode 324 arranged anode to cathode to the base lead of the transistor 266 of the loop current status detector 72. The input of the inverter gate 322 is also connected to the output 78 of the ring voltage detector stage 76. The input of the inverter gate 288 is connected to the negative supply 126 through the parallel combination of a resistor 326 and a selective connection arrangement 328. The selective connection arrangement 328 in a specific embodiment is a jumper wire which is connected to inhibit the generation of the identification tone by the tone generator stage 76. The jumper 328 is omitted or removed to allow operation of the tone generator stage 76. The input of the inverter gate 292 is connected to the ground reference 118 through a resistor 330. The parallel combination of a resistor 332 and a capacitor 334 is connected between the input of the inverter gate 296 and the negative supply 126.

The high level at the output 78 of the ring voltage detection stage 76 during ring voltage detection produces a low input to the inverter gate 300. The low input to the inverter gate 300 continues throughout ringing, the silent intervals between ring intervals and approximately six seconds after the last ring cycle. After six seconds past the last ring cycle, the input to the NOR gate 300 will return to a high level and the tone generator stage 76 will be inhibited.

Upon the pay station 14 being rung and going off-hook, the transistor 266 is rendered conductive and current flows through the diode 284 and the resistor 286 to produce a high level at the input of the inverter gate 288. The high to low transistion at the output of the inverter gate 288 is coupled through a capacitor 290 to the input of the inverter gate 292. A relatively short positive pulse occurs at the output of the inverter gate 292 that immediately charges the capacitor 334. The capacitor 334 then discharges through the resistor 332. Thus, a negative pulse of approximately one second duration as determined by the RC time constant of the capacitor 334 and the resistor 332 is generated at the inverter gate 296. Assuming that ringing voltage has previously been detected and a low input is present to the NOR gate 300 from the inverter 322, the tone generator stage 76 will be enabled for approximately a one second period to generate an audible tone on the T (IN) line. The oscillator formed by gates 298 and 300 along with the capacitor 302, the resistor 306 and the variable resistor 308 determine the frequency of the audible tone. This audible tone serves as an identification tone to the operator to indicate that a pay station has answered.

The hold stage 84 of the prepay adapter circuit 10 includes a PNP transistor 340. The collector lead of the transistor 340 is connected to the output 88 of the hold stage 84. The emitter lead of the transistor 340 is connected to the T (IN) line. The base lead of the transistor 340 is connected through a resistor 342 to the output 86 of the C-lead status detector stage 48. The fixed line termination discussed hereinbefore is included in the coin control relay arrangement 52 and is connected during coin control (return or collect) operations and when the hold output 88 is active. The hold output 88 is active when the output 86 of the C-lead status detector stage 48 indicates that the pay station 14 is off-hook. Referring to a specific embodiment of the tone control circuit 12, the Model TD-4 system referenced hereinbefore, the hold stage 84 is connected between the T (IN) line of the TD-4 system and the contact identified as number 11 of the collect relay (drawing number 434-227B at page 7 of the CEECO TD-4 technical description form 1015-6). The existing connection between the T (IN) line and the contact 11 is then disconnected and the hold stage 84 is connected in lieu of the connection. The hold output 88 is connected to contact 11 of the collect relay.

The C-lead control stage 90 includes the parallel combination of a resistor 346 and a diode 348 arranged cathode to anode, between the output 94 of the C-lead status detector stage 48 and one end of a resistor 350. The other end of the resistor 350 is connected to the base lead of a PNP transistor 352. A capacitor 353 is connected between the junction of the resistors 350 and 346 and the negative supply 126. The emitter lead of the transistor 352 is connected to the ground reference 118. The collector lead of the transistor 352 is connected through a resistor 354 to the base lead of an NPN transistor 356. The emitter lead of the transistor 356 is connected to the negative supply 126. The collector lead of the transistor 356 is connected through a relay coil 358 to the ground reference 118. A diode 360 is connected anode to cathode between the collector of the transistor 356 and the ground reference 118.

The relay coil 358 controls a movable center contact 362 between a pair of contacts 364 and 366. The contact 366 is normally open and connected through a diode 368 cathode to anode to the ground reference 118. The movable center contact 362 is connected to the C (OUT) line. The normally closed contact 364 is connected to the C (IN) line and through a diode 370 anode to cathode to the C (OUT) line. The diode 370 provides a path for ANI signals or the like from the C (IN) line to the C (OUT) line regardless of the status of the center contact 362.

The relay coil 358 receives current through the transistor 356 upon the C (OUT) lead from the line finder 24 switching from −48 VDC (C.O. battery) to approximately ground potential. This occurs when the pay station is placed off-hook. This signal C (OUT) is supplied through the normally closed contact 364 to the C (IN) lead to the pay station first selector 28. Further, the potential on C (IN) also provides a high level to the gate 178 of the C-lead status detector stage 48. Thus, the output 94 is at a low level. With relay coil 358 energized, the normally open contact 366 is connected to the center contact 362, and the C (OUT) lead is connected to the ground reference 118 thru diode 368.

This condition continues for a predetermined time interval after the pay station is placed on hook, thus allowing time for the coin control function. In a specific embodiment, the time interval is approximately two seconds. Upon the pay station being placed on hook, the C (IN) lead switches to −48 v. The output 94 switches to a high level and the capacitor 353 begins to charge. After the two second time interval, the current through the relay coil 358 will cease and the relay contact 366 will be placed in the normally open state. At this point, the pay station line will be released. The two second time interval is provided by the RC time constant of the resistor 346 and the capacitor 353.

The various NOR and INVERTER logic gates identified hereinbefore in connection with the prepay adapter circuit 10 of FIG. 4 include power supply connections between the ground reference 118 and the negative supply 126 to provide a 12 VDC power supply.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed and desired to be secured by Letters Patent of the United States is:

1. An electronic prepay adapter for use in converting semi-postpay central office telephone equipment to full prepay operation, the semi-postpay central office equipment including central office battery supply connections, ringing power supply connections, collect and return power supply connections, control lead connections, and tip and ring leads, the prepay adapter and a coin control arrangement being connectable either between the first selector and line finder equipment of the central office equipment to control a plurality of pay station lines connected to the line finder equipment or between the line relay and the pay station tip and ring line pair to control a single pay station line, the prepay adapter equipment being connected to the central office battery supply connections and the control, tip and ring leads, the coin control arrangement being connected to the collect and return power supply connections and the tip and ring leads, the coin control arrangement including apparatus for selectively outputting the collect and return power supplies on the pay station line in response to a control input; the prepay adapter comprising:

means for detecting line polarity reversal during answer supervision;

means responsive to the control lead for detecting the placing of the controlled pay station line in an on-hook mode;

means responsive to said line polarity reversal detecting means and said on-hook detecting means for controlling the coin control arrangement over the control input, said controlling means comprising memory means being conditioned to a set to collect state after detection of said line polarity reversal, means responsive to said memory means for generating a collect signal to the coin control arrangement over the control input after detection of said on-hook mode and said memory means being in a set to collect state, and means responsive to said memory means for generating a return signal to the coin control arrangement over the control input after detection of said on-hook mode and said memory means being in a set to return state;

means for detecting a line imbalance condition on the pay station line during a reverse line polarity condition; and means responsive to said line imbalance detecting means for selectively muting the audio path to the pay station line during a reverse line polarity condition, said audio path muting means being operable to mute the audio path until a line imbalance condition is detected.

2. The prepay adapter of claim 1 further comprising means for detecting loop current in the pay station line to inhibit operation of said audio path muting means unless loop current is detected.

3. The prepay adapter of claim 1 further comprising means for detecting ringing voltage on the pay station line, said memory means being conditioned to a set to collect condition responsive to said ring voltage detecting means.

4. The prepay adapter of claim 1 wherein said memory means is conditioned to a set to return state after generation of said return signal or said collect signal.

5. The prepay adapter of claim 1 further comprising control lead control means for maintaining the control lead to the line finder equipment at a level indicating off-hook status of the pay station line for a predetermined interval of time after the control lead from the first selector equipment switches from a level indicating off-hook status to a level indicating on-hook status.

6. An electronic prepay adapter for use in converting semi-postpay central office telephone equipment to full prepay operation, the semi-postpay central office equipment including central office battery supply connections, ringing power supply connections, collect and return power supply connections, control lead connections, and tip and ring leads, the prepay adapter and a coin control arrangement being connectable either between the first selector and line finder equipment of the central office equipment to control a plurality of pay station lines connected to the line finder equipment or between the line relay and the pay station tip and ring line pair to control a single pay station line, the prepay adapter equipment being connected to the central office battery supply connections and the control, tip and ring leads, the coin control arrangement being connected to the collect and return power supply connections and the tip and ring leads, the coin control arrangement including apparatus for selectively outputting the collect and return power supplies on the pay station line in response to a control input; the prepay adapter comprising:

means for detecting line polarity reversal during answer supervision;

means responsive to the control lead for detecting the placing of the controlled pay station line in an on-hook mode;

means responsive to said line polarity reversal detecting means and said on-hook detecting means for controlling the coin control arrangement over the control input, said controlling means comprising memory means being conditioned to a set to collect state after detection of said line polarity reversal, means responsive to said memory means for generating a collect signal to the coin control arrangement over the control input after detection of said on-hook mode and said memory means being in a set to collect state, and means responsive to said memory means for generating a return signal to the coin control arrangement over the control input after detection of said on-hook mode and said memory means being in a set to return state;

means for detecting ringing voltage on the pay station line;

means for detecting loop current in the pay station line; and means responsive to said ringing voltage detecting means and said loop current detecting means for generating an identification tone for a predetermined interval of time on the pay station line after the pay station line has been rung and placed in an off-hook state.

7. The prepay adapter of claim 6 wherein said memory means is conditioned to a set to return state after generation of said return signal or said collect signal.

8. The prepay adapter of claim 6 further comprising control lead control means for maintaining the control lead to the line finder equipment at a level indicating off-hook status of the pay station line for a predetermined interval of time after the control lead from the first selector equipment switches from a level indicating off-hook status to a level indicating on-hook status.

* * * * *